United States Patent Office 2,702,473
Patented Feb. 22, 1955

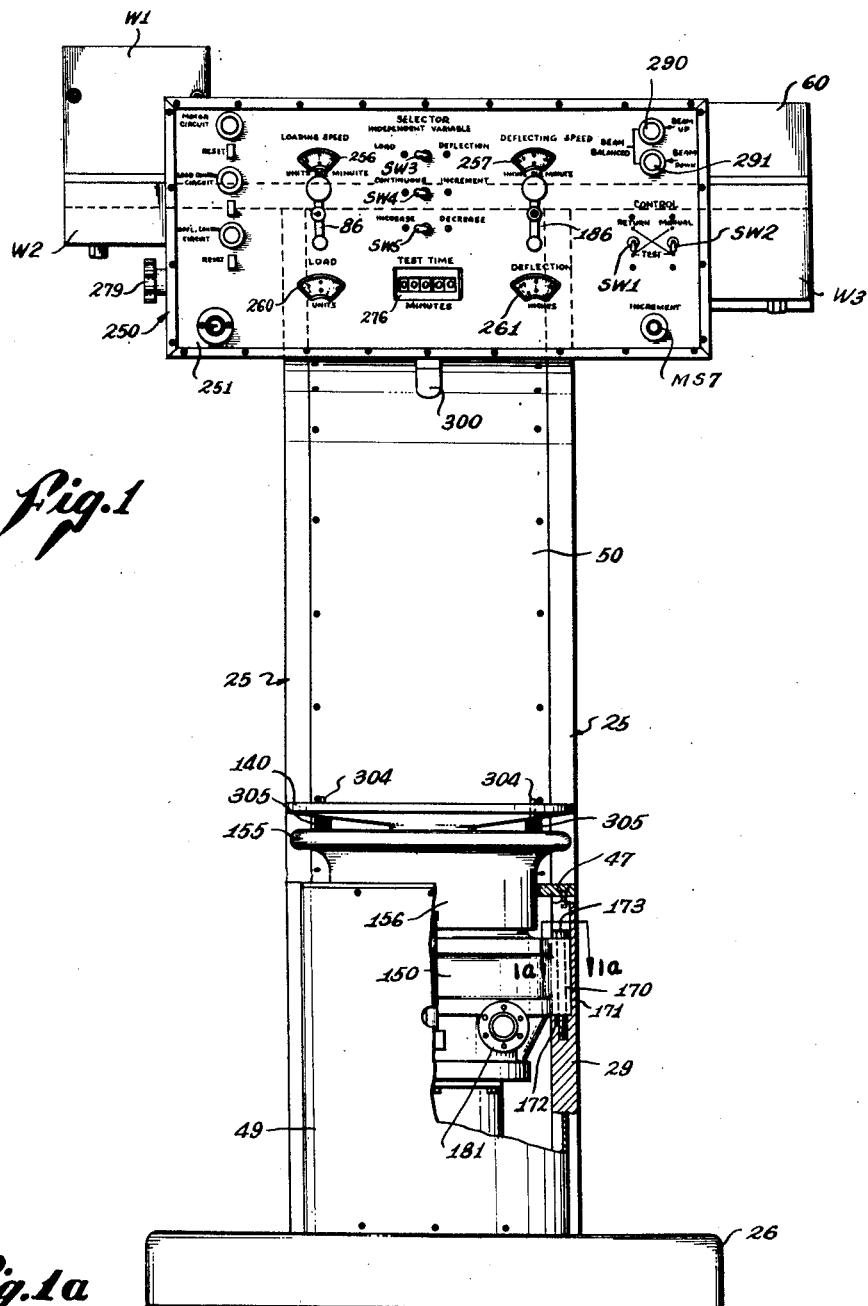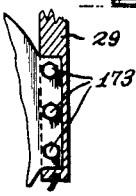

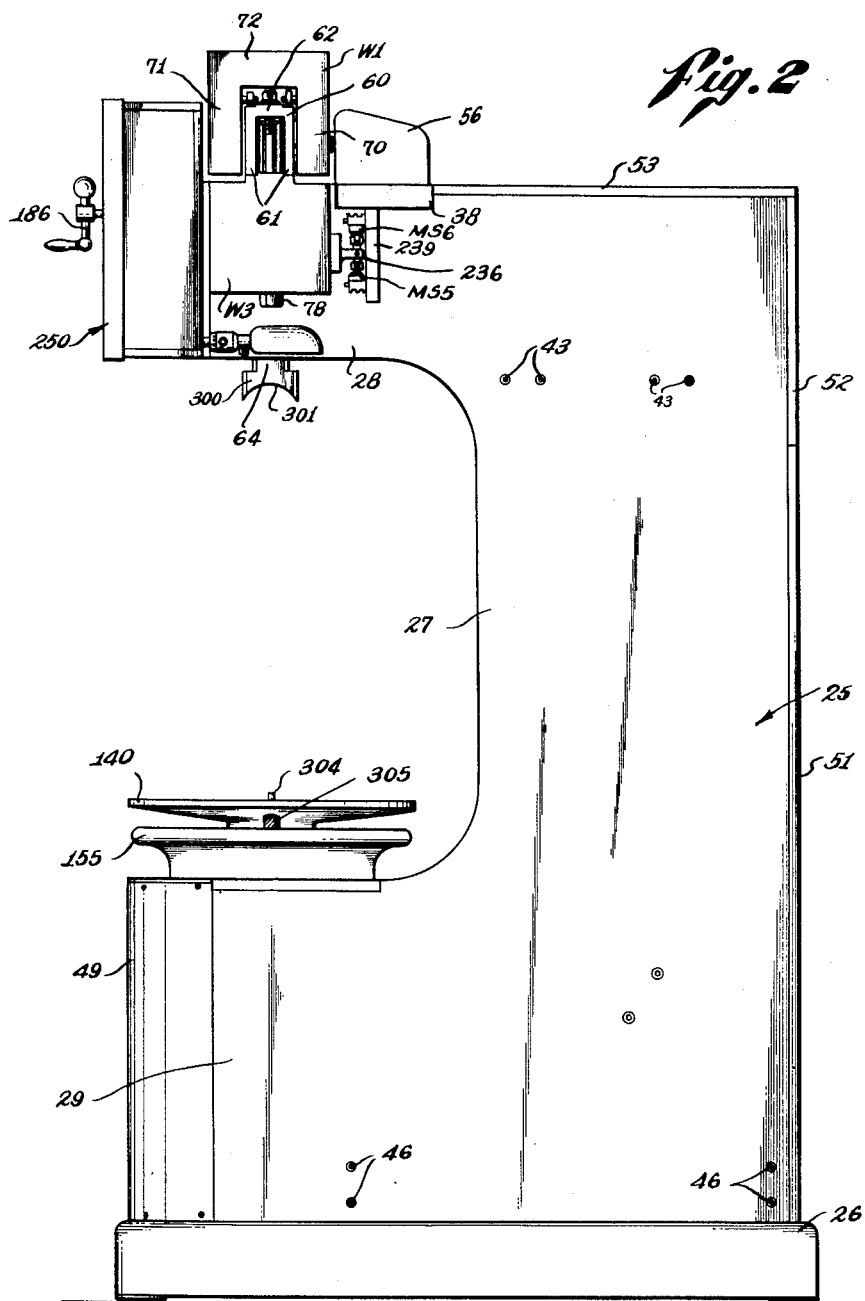

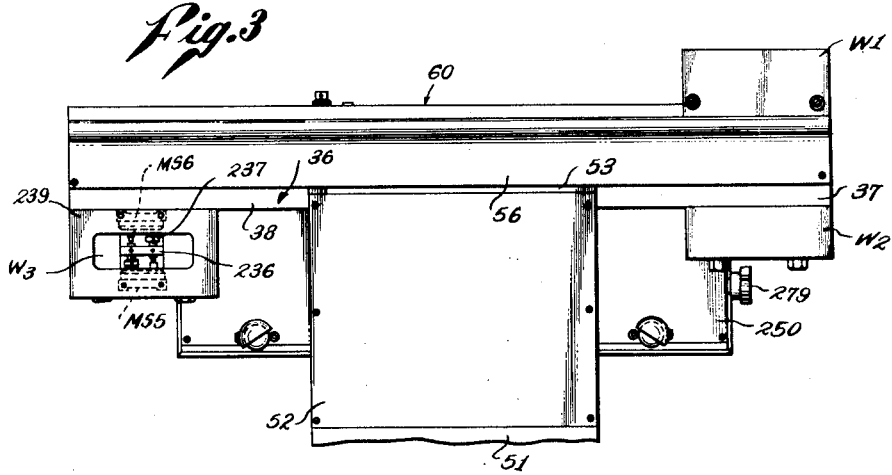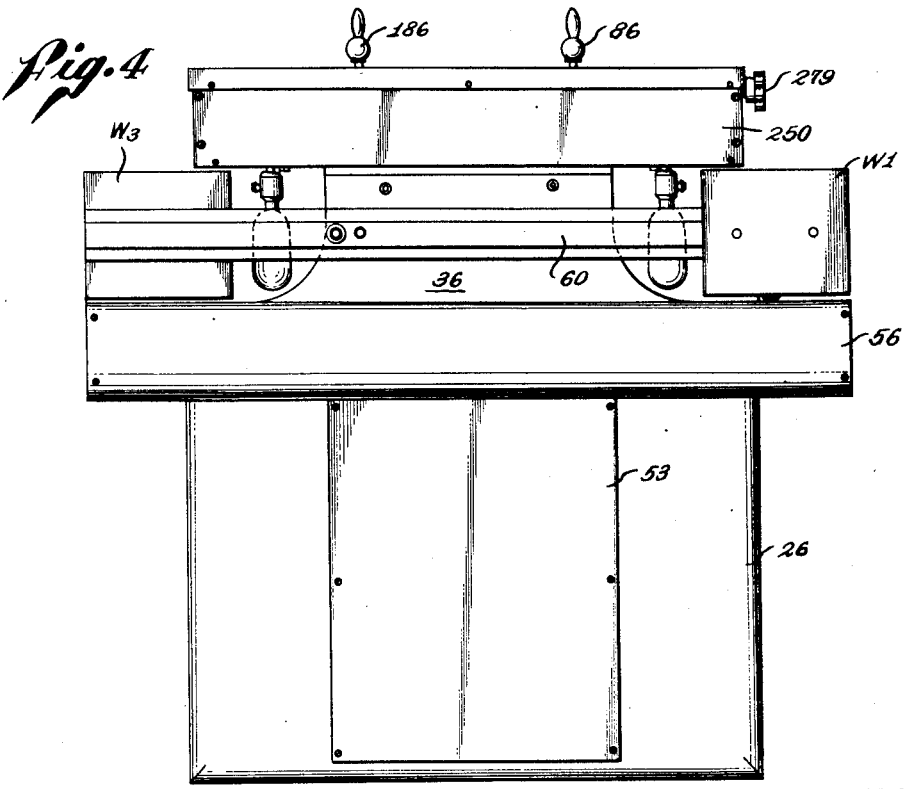

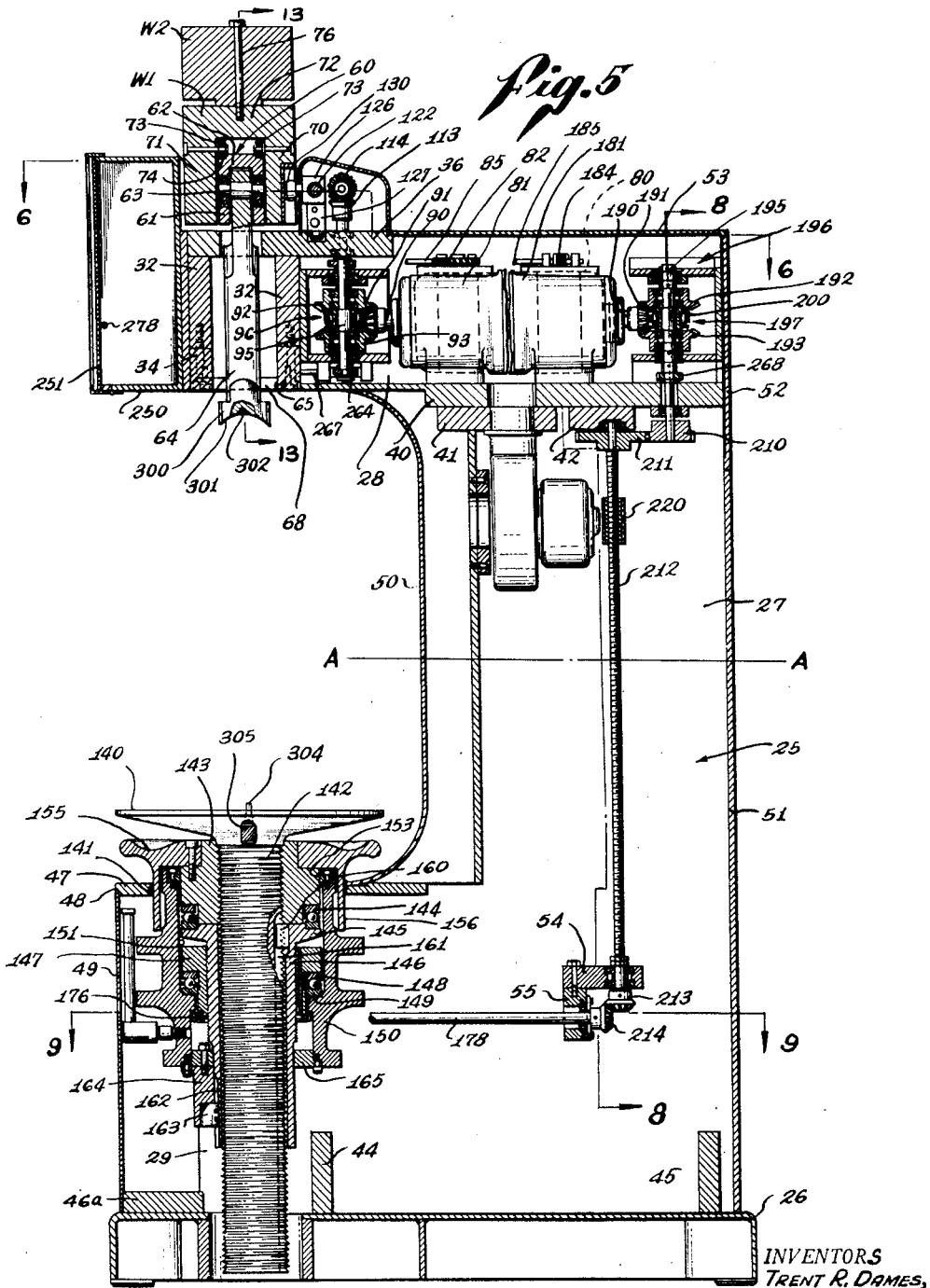

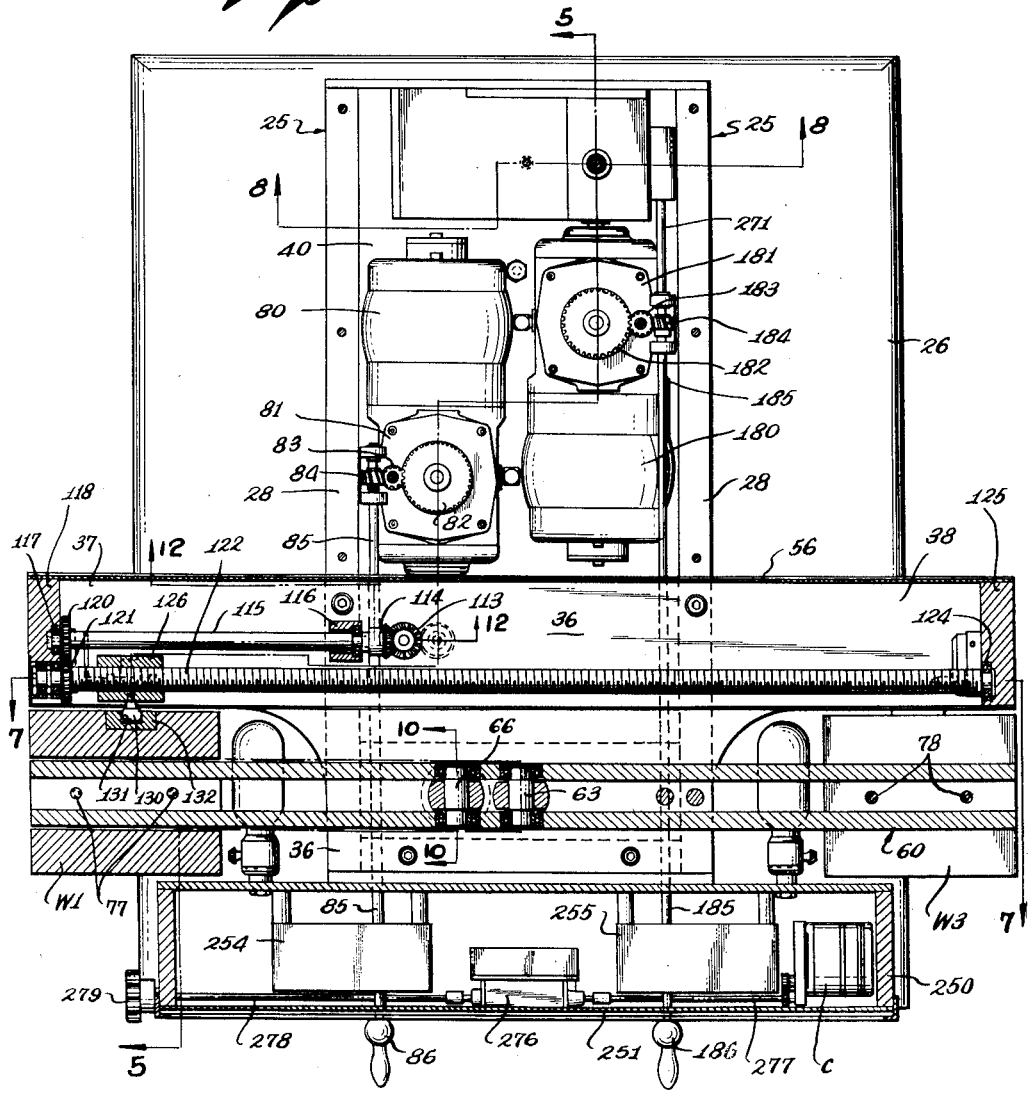

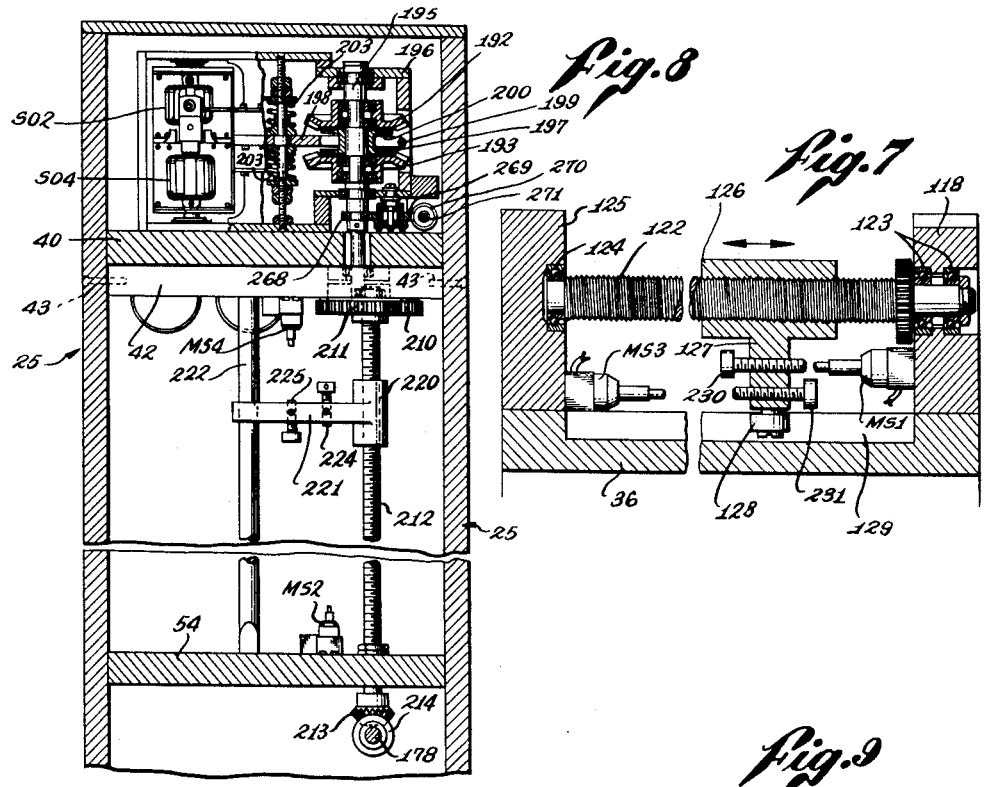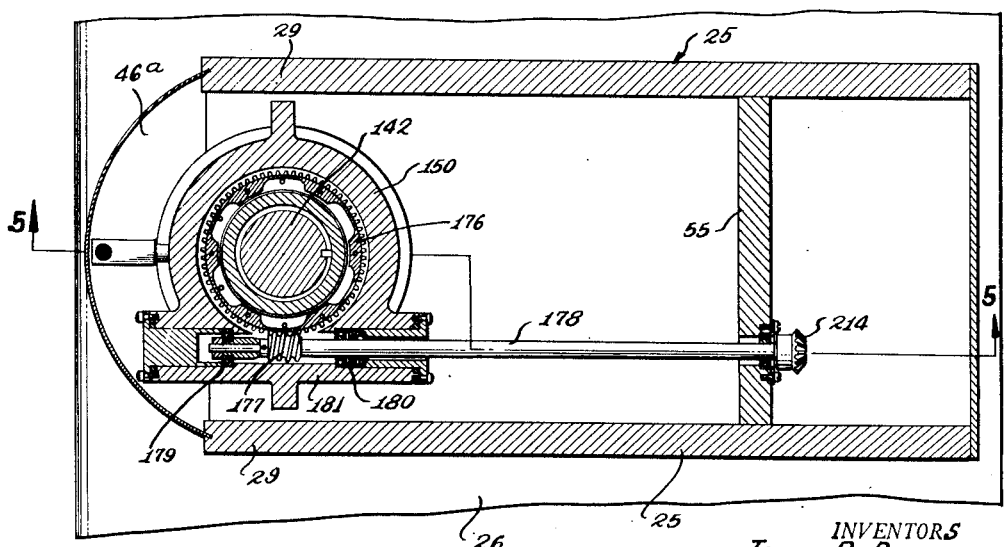

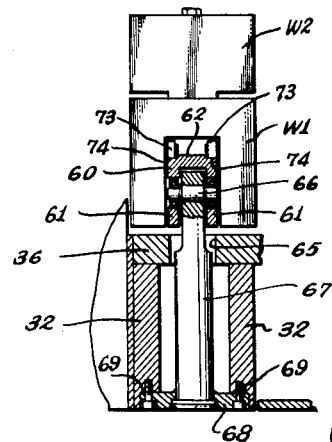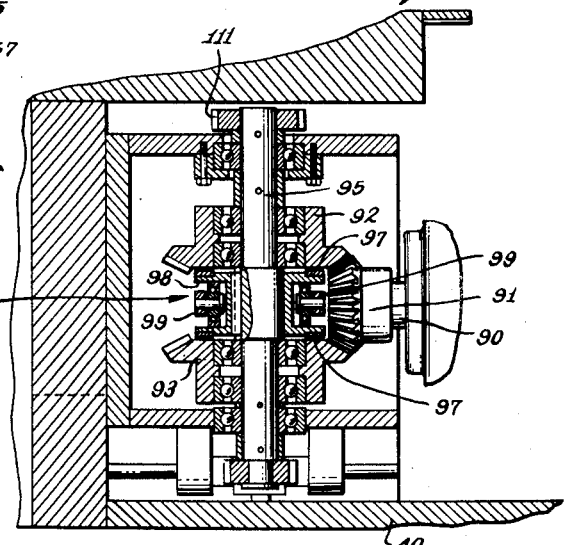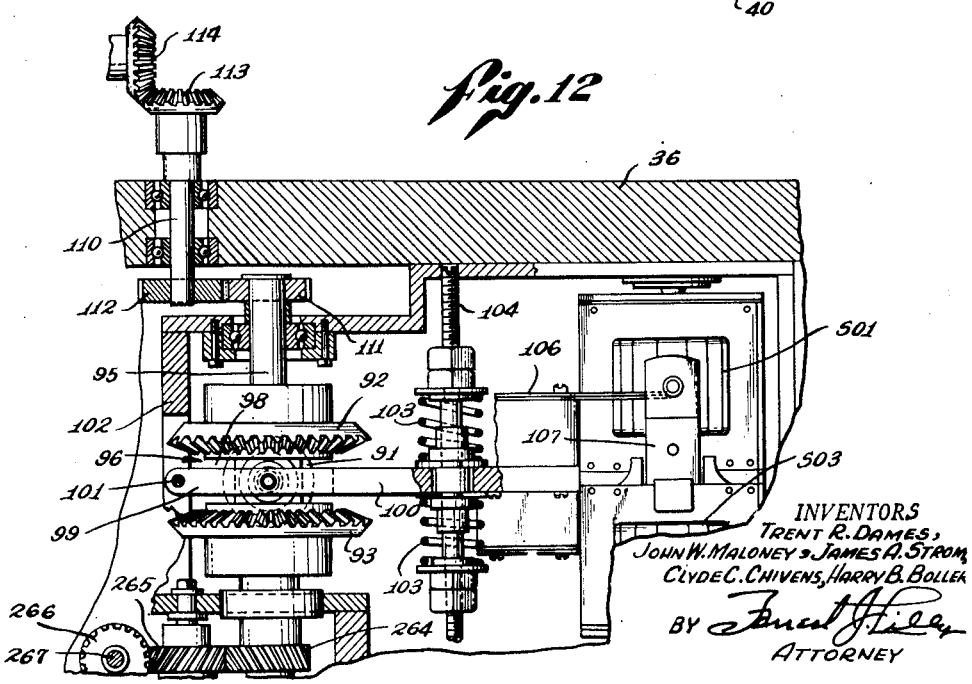

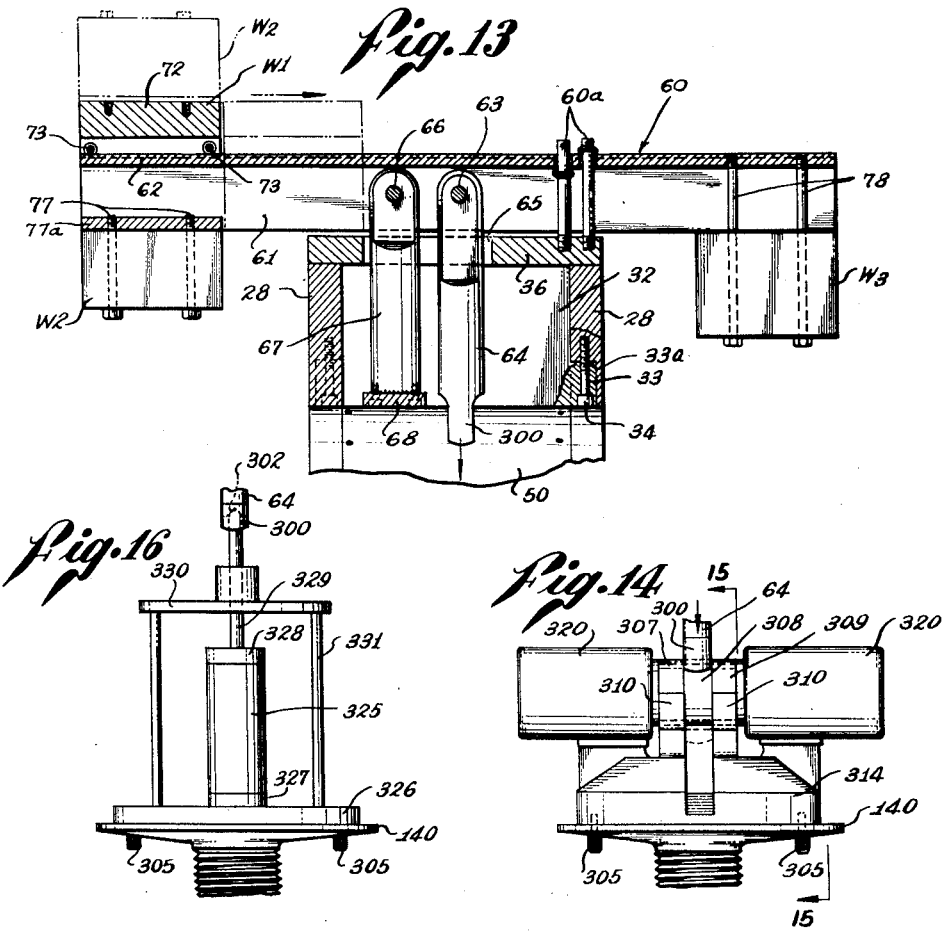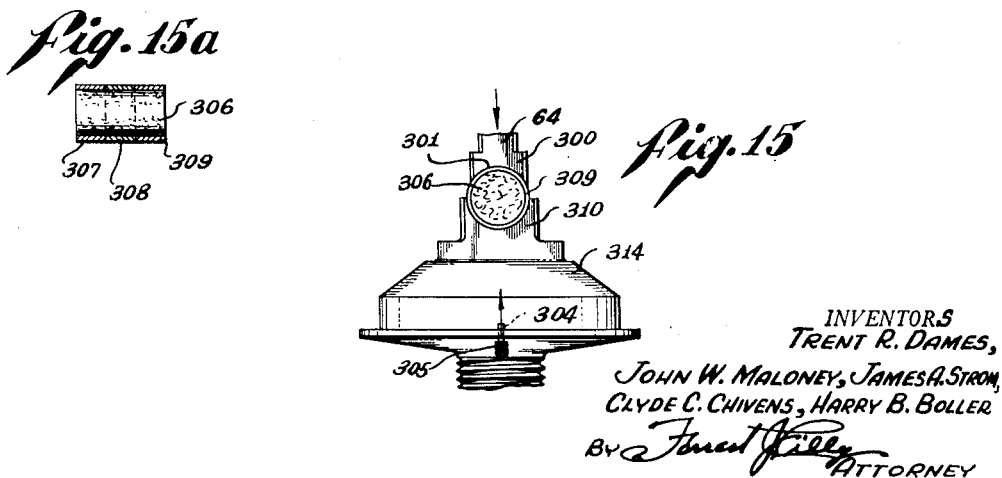

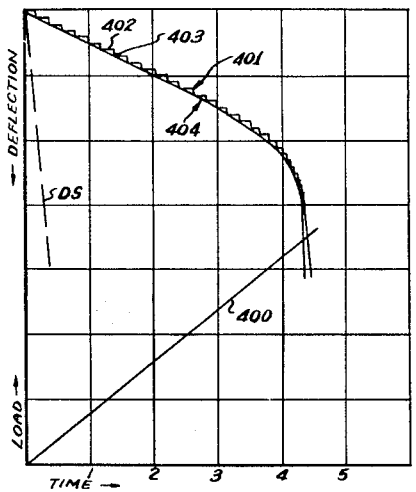
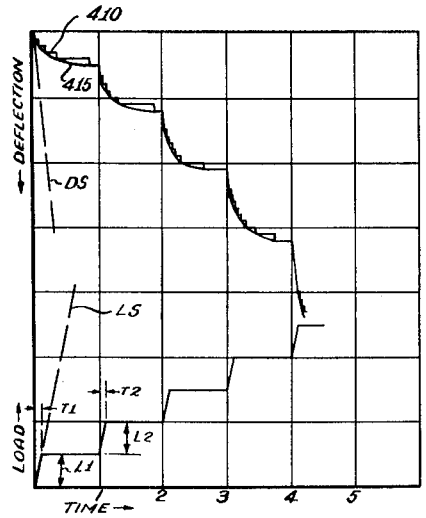
Fig. 18
Fig. 19
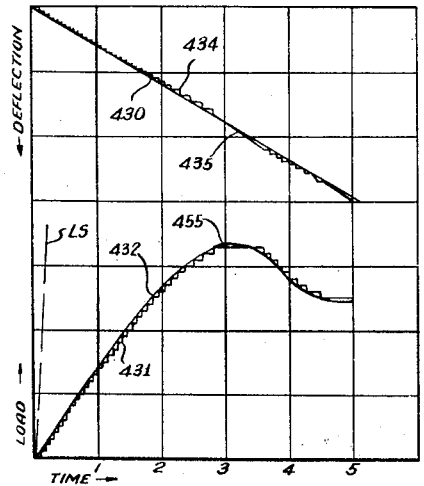
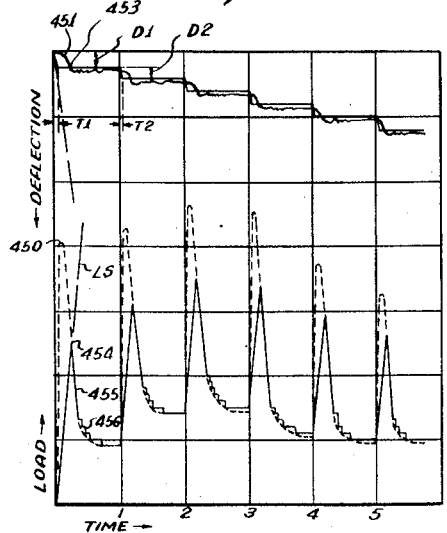
Fig. 20
Fig. 21

2,702,473

MATERIALS TESTING MACHINE HAVING LOAD AND DEFLECTION CONTROL MEANS

Trent R. Dames, San Marino, James A. Strom, Los Angeles, John W. Maloney, Alhambra, Clyde C. Chivens, Pasadena, and Harry B. Boller, Alhambra, Calif., assignors to Dames and Moore, Los Angeles, Calif., a partnership Application December 12, 1951, Serial No. 261,352

5 Claims. (Cl. 73—90)

This invention relates generally to materials testing machines, particularly to machines indicating the stress, strain relationship of materials in shear, compression, etc. The testing machine of the invention lends itself to the making of various kinds of tests on various materials under various types of loading. For illustrative purposes only, and without intention of limiting the invention thereby, the invention will be herein described primarily as used in four types of tests on soil samples in shear. The application of the machine to a similar series of compression tests of a column of material, such as soil, will also be indicated.

The present invention may be regarded generally as directed to improvements in the basic subject matter of application Serial No. 77,382, filed February 19, 1949, now U. S. Patent No. 2,656,718, for Soil Shear Testing Machine. Objects of the present invention are, generally speaking, the provision of a materials testing machine capable of carrying out with great accuracy and precision the types of tests outlined, and at the same time characterized by improved versatility, greater simplicity, lower cost of manufacture, and also improved convenience of operation.

In the making of a materials strength test of the class here in contemplation, there are in general two variables, an independent variable, and a dependent variable. Assume for example, a shear test on a soil sample, and assume that the type of test to be made involves application of successive increments of shear stress load at uniform time intervals to the sample, and measurement of the resulting deflection or strain, giving data from which a curve of deflection vs. time may be plotted. In this case, the independent variable is the successive incremental shear loading of the sample, while the dependent variable is the resulting deflection or strain, giving data from which deflection vs. time may be plotted. It will be seen that the independent variable may typically be a shear stress, as here, or an incremental compressive loading of a column of material, and that the dependent variable will in like manner be deflection or strain in shear, or compression, as the case may be, depending upon the nature of the material and independent variable. The testing machine of the invention is capable also of being set up to employ as the independent variable a continuous loading, and the dependent variable will then be the resulting deflection. Again, the independent variable may be a continuously imposed rate of sample deflection or strain under either shear or compressive loading, in which case the dependent variable becomes the loading necessarily imposed to accomplish such continuous deflection. This loading is also the strength of the sample against such an enforced deflection. Finally, the independent variable may be an incremental deflection, and the dependent variable is then the load necessary to cause such incremental deflection.

The advantage in being able to run a test by any one of the procedures illustrated is that it enables the engineer to select the type of test indicated for the particular type of loading conditions anticipated in the material under consideration. Another advantage is that the results obtained by one test procedure can be compared with those obtained by the other procedure, and with other test data compiled by other investigators using any one or more of these methods, or others, so that the ultimate findings will represent resaonable conclusions based upon a comprehensive collection of data derived from a variety of sources.

The machine of the present invention is built around a fulcrumed beam carrying a power driven longitudinally traveling loading member, preferably a weight. At a short distance along the beam from its fulcrum, the beam is linked to a device through which a loading force, such as a shearing force, may be exerted downwardly on the sample, the degree of the loading force depending upon the position of the traveling weight along the beam. The sample is supported from below through a suitable holder from a platen, which is capable of being raised or lowered by means of a power driven screwjack. Microswitches operated by the swinging of the beam control the power mechanism driving the longitudinally traveling beamweight, and also the jackscrew, depending upon the type of test. Assume, as one illustrative example, the type of test wherein the independent variable consists of predetermined "load increments" imposed or added at predetermiend time intervals, the dependent variable then being the resulting deflection with time. Assume also, that the same to be sheared is in the machine, with the screwjack elevated until the sample holder supports the sample in position to be sheared by downward deflection of the beam. Operation is then as follows: The traveling weight is driven outward along the beam by its power mechanism at constant speed, thus gradually increasing the loading on the sample toward the full first predetermined "load increment" to be imposed. This is continued in a uniform manner until the predetermined "load increment" has been imposed, whereupon the weight is temporarily arrested in its outward travel. As soon, however, as some initial portion or "sub-increment" of this predetermined "load increment" has been imposed, the beam is overbalanced and swings down against the shearing resistance of the sample, incrementally shearing the sample. The beam, thus tilting to a slight angle below its normal horizontal position, actuates a microswitch energizing a solenoid controlling the power means for the screwjack, thereby operating the latter to elevate the platen and the sample holder. The sample is thus forced upwardly, exerting an upward force on the beam, which returns to its horizontal position. The microswitch then de-energizes the said solenoid, stopping the power mechanism for the screwjack, and the upward movement of the sample is arrested. By this time, the traveling weight has moved further out on the beam, causing the beam to descend again, under slightly greater load, and to cause a further incremental shear of the sample, whence the cycle is repeated. There may be one or a number of such cycles while the traveling weight is moving out to the position at which the first predetermined "load increment" is imposed. At such time the power mechanism for the traveling weight is arrested, leaving the predetermined load increment imposed for the balance of the first time interval. The sample continues to yield under the predetermined "load increment" following the cessation of outward movement of the beam loading weight. Following each incremental shear, the beam-controlled microswitch starts the drive means for the screwjack to elevate the sample sufficiently to bring the beam back to horizintal. Thus each incremental shear, as the sample yields with time under the imposed "load increment," causes the machine to react to re-elevate the sample, and the beam. The rate of yield under the imposed load increment ordinarily gradually decreases with time. Finally, the first predetermined time interval expires, and the drive means for the beam loading weight is restarted to impose on the sample a second load increment, usually equal to the first, so that the sample is thus subject to double its first loading. The process as thus outlined is then repeated through any desired number of load increments, added during successive time intervals. Readings are taken of load, shear, and time, to be later plotted on graph paper.

The above operation is of course present in only one type of test of which the machine is capable, but will suffice at this point to illustrate the general nature of the testing machine of the invention. Other performances of which the machine is capable will be described hereinafter.

The invention will be best understood by now referring to the following detailed description of one present illustrative embodiment thereof, reference for this purpose being had to the accompanying drawings, in which:

Figure 1 is a front elevational view of the present illustrative embodiment of the invention, parts being broken away to show underlying structure in section;

Figure 1a is a detail section taken on line 1a—1a of Figure 1;

Figure 2 is a side elevational view of the machine;

Figure 3 is a rear elevational view of the upper portion of the machine;

Figure 4 is a plan view of the machine;

Figure 5 is a broken vertical sectional view of the machine, being taken on the broken line 5—5 of Figure 6 above the plane A—A in Figure 5, and on the broken section line 5—5 of Figure 9 below the plane A—A of Figure 5;

Figure 6 is a broken section taken on line 6—6 of Figure 5;

Figure 7 is a section taken on line 7—7 of Figure 6;

Figure 8 is a section taken on line 8—8 of Figure 6;

Figure 9 is a horizontal section taken on line 9—9 of Figure 5;

Figure 10 is a detail section taken on line 10—10 of Figure 6;

Figure 11 is an enlarged detail taken from Figure 5;

Figure 12 is a section taken on broken line 12—12 of Figure 6;

Figure 13 is a section taken on line 13—13 of Figure 5;

Figure 14 is a utility view showing portions of the machine of Figures 1 to 13, together with appliances for carrying out a shear test of a sample of material;

Figure 15 is a section taken on broken line 15—15 of Figure 14;

Figure 15a is a longitudinal sectional view of a soil core contained in typical test rings;

Figure 16 is a utility view generally similar to Figure 14 but showing appliances for carrying out a compression test;

Figures 18, 19, 20 and 21 are graphs illustrating, with substantial exaggeration, the operation of the machine in making various types of tests of which the machine is capable.

Figure 17:
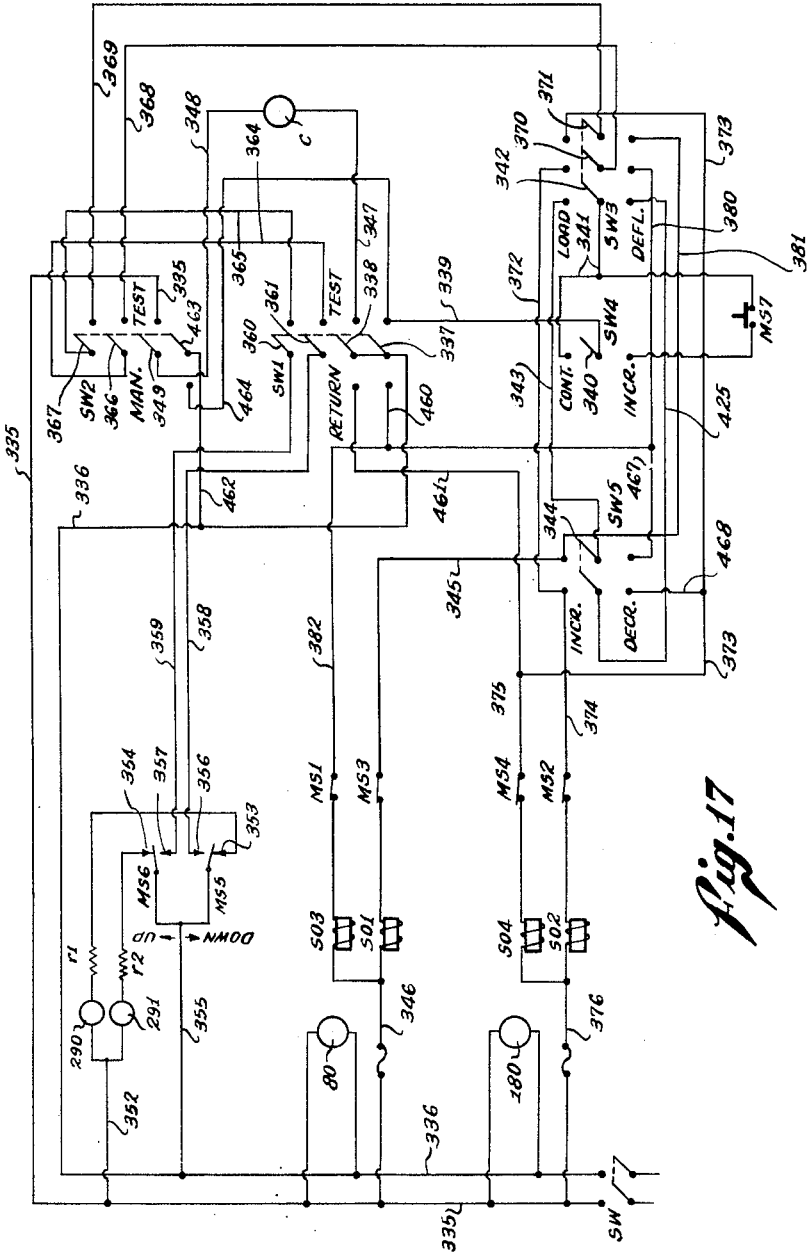
Figure 17 is a schematic electrical wiring circuit for the machine.

The illustrative embodiment of the invention has a main frame in the general form of a C, formed principally of two sturdy parallel, vertically disposed C-shaped side plates 25, composed preferably of aluminum for lightness with strength, a generally rectangular base 26, and various cross-bracing tying the two side plates together. The C-frames comprise vertically disposed portions 27, and upper and lower forwardly projecting portions or arms 28 and 29, respectively.

Two parallel beam deck braces 32 extend between the forward ends of C-frame arms 28, and are formed at the ends with keys 33 engaging in notches 33a in arms 28, being fastened to arms 28 by means of screws 34 (Figures 5 and 13). Thus upward forces exerted on braces 32 in the operation of the later described beam, whose fulcrum is supported by said braces, are transferred to and resisted by the arms 28 of the C-frame.

The C-frame arms 28 are notched at the top for a distance back from their ends to receive a beam deck 36, and as best shown in Figure 6, the rearward portion of this beam deck has lateral projections or wings 37 and 38 extending oppositely beyond the two C-frame arms. As indicated in Figure 13, the top edges of cross braces 32 engage the underside of the beam deck 36.

A motor deck 40 extends horizontally between the C-frames 25, at the level of the lower edge of the arms 28. This motor deck 40 is received closely but slidably between the two frame arms 28, and its forward end engages against the adjacent beam deck brace 32. It is supported by two horizontal cross braces 41 and 42 (Figure 5) which extend between the two C-frame members 25 and are secured thereto as by means of screws 43. The motor deck is removable from the rear of the machine simply by sliding it out rearwardly on these cross braces 41 and 42, which thus serve as supporting tables for the motor deck and parts carried by the latter. Suitable screws, not shown, may be employed for securing the deck 40 down to the tables 41 and 42. Removal of these screws frees the motor deck and parts carried thereby for rearward removal from the machine.

Two parallel cross braces 44 and 45 tie the C-frames together at the bottom, being secured to the C-frames by suitable screws, such as indicated at 46 in Figure 2. The lower edges of these cross braces engage the base member 26, and thus function to support the machine on said base.

Extending between the forward ends of the lower C-frame arms 29, at the bottom thereof, so as to rest on base 26, is an arcuate plate 46a (Figures 5 and 9), and between said arms 29, at the top, is a horizontal plate 47 having an arcuate edge 48 conforming to the arcuate edge of plate 46a. A removable arcuate cover plate 49 fits these arcuate edged plates 46 and 47, and is secured thereto and to the forward edges of frame arms 29. A removable front cover plate 50 extends between the forward edges of frame plates 25, and from horizontal plate 47 to the underside of motor deck 40 (Figure 5). A back plate 51 is secured to the rearward edges of frame plates 25, its upper edge terminating below motor deck 40, and a removable panel 52 is secured to plates 25 over the area of motor deck and parts carried thereby. A removable cover plate 53 is secured to the upper edges of frame plates 25 over motor deck 40 and members carried by the latter. Horizontally extending members 54 and 55, carrying bearings for later described shafting, also extend between and are secured to the frame members 25, and complete the cross bracing of the frame plates 25. Cover 56 on deck 36 encloses a later described lead screw.

A fulcrumed beam 60 is positioned over the forward ends of the upper C-frame arms 28, so as to extend transversely of said arms, and in the illustrative embodiment, is of inverted U-shape in cross-section, having parallel legs 61 depending from a central or cross-portion 62 connecting the upper ends of said legs. At its center or midpoint this beam is pivotally connected, as at 63, to a depending loading rod 64 which extends downwardly through an aperture 65 in beam deck 36, its lower end being adapted for engagement with load exerting appliances, as later described. At a short distance to one side of this pivot 63, the beam is pivotally connected, or fulcrumed, as at 66, to the top end of a fulcrum rod 67. The bottom end of the latter is secured, as by welding, to a support plate 68 whose end portions engage downwardly facing shoulders 69 at the lower ends of beam braces 32 (Figures 10 and 13). In service, a downward load is exerted by the weighted beam on the loading rod 64, with the result that the fulcrum rod 67 is placed in tension, and acts through plate 68 and cross braces 32 to exert an upward force on the upper arms of the C-frame 28. Preferably, anti-friction bearings are used at both the pivotal connection to the loading bar and the fulcrum, as seen best in Figure 6. Limit stop members 60a (Figure 13) prevent over swinging of the beam.

A traveling weight W1 is arranged for movement longitudinally along beam 60. This weight W1 is also of inverted U-shape in cross-section (see Figure 5), having parallel legs 70 and 71 depending from a central or cross portion 72 connecting the upper ends of said legs. The two legs 70 and 71 of weight W1 extend downwardly at opposite sides of the beam 60, and said weight rides on beam 60 by means of anti-friction rollers 73 mounted on the legs 70 and 71 adjacent the inner sides of said legs and bearing down on recessed, longitudinally extending tracks 74 formed on the upper side of the beam 60. A second weight W2 is provided, and is adapted to be secured to the upper side of traveling weight W1, as by means of screw 76 (see Figure 5), or alternatively, to be secured to the underside of beam 60, at the left hand end thereof as viewed in Figure 13, as by means of screws 77 engaging in a plate 77a secured to the beam. At the opposite or right hand end of beam 60, as viewed in Figure 13, is located a third or counterweight W3, secured to the beam as by means of screws 78. The traveling weight W1 has a normal starting position at the left hand end of the beam, as viewed in Figure 13, and is adapted to be driven, by mechanism presently to be described, longitudinally along the beam from the left hand end to the right hand end thereof, the loading exerted on the loading rod 64 being continuously increased in such direction of travel. The relative weights of W1, W2 and W3 are so proportioned with relation to each other and to their moment arms about the fulcrum axis of the beam that in the normal starting position of Figure 13, the moment arms of the two weights W1 and W2, together with that of the portion of the beam to the left of the fulcrum, are equalled by the moment arm of weight W3, together with that of the portion of the beam to the right of the fulcrum, plus any weight of the loading rod 64. In other words, in the position of Figure 13, the beam 60 is in balance. The beam would also be in balance if weight W2 were mounted in its alternative position, shown in phantom line in Figure 13, and in full line in Figure 5. Assume first that the weight W2 is mounted on the beam, in the position shown in full lines in Figure 13. Displacement of traveling weight W1 toward the right will then decrease the moment arm of weight W1, unbalancing the beam, so that it tends to swing in a clockwise direction, exerting a downward force on loading rod 64. It will be seen that the counterclockwise or "negative" moment arm of traveling weight W1 will thus gradually decrease as weight W1 approaches the fulcrum axis of the beam, and that when weight W1 crosses the fulcrum axis of the beam, it thereafter imposes a gradually increasing clockwise or positive moment arm, additive to that of weight W3, so that the load then continues to increase as the weight W1 travels from the fulcrum axis toward the right hand end of the beam. Thus, the weight W1 gradually imposes greater and greater downward force on the loading rod 64 as it travels from its starting position of Figure 13 to the far or right hand end of the beam, doing this by gradually decreasing its negative moment arm during the first portion of its travel, and then creating and gradually increasing a positive moment arm during the second portion of its travel. It will be seen that this makes for a compact beam arrangement, much shorter than would be the case in the more conventional beam arrangement with a traveling weight located always on one side of the fulcrum axis. The only difference with the weight W2 mounted on top of the traveling weight W1 is that the loading imposed on the loading rod 64 is increased at a more rapid rate. For example, it is thus made easy, by proper selection of weight ratios, to double the rate of loading, or to increase it in any other ratio.

Motive power mechanism for moving traveling loading weight W1 along the beam will next be described. A loading weight drive motor 80 is mounted on motor deck 40, and drives any suitable or conventional variable speed drive transmission unit, indicated generally at 81. Such transmission units are known and commercially available, and need not be described in detail. The one here illustrated has speed control mechanism operated by a gear 82, driven through meshing helical gears 83 and 84 from a shaft 85 operated through a later described gear reduction box by a hand crank 86 at the front of the machine (Figure 6). Drive unit 81 drives a shaft 90 carrying a bevel gear 91 which meshes with two bevel gears 92 and 93 mounted for rotation on a vertical shaft 95 (Figures 5, 11 and 12). These bevel gears will be seen to turn in opposite directions. A clutch 96 splined to shaft 95 between the two bevel gears is engageable with either to drivingly connect with said shaft. As seen best in Figure 11, this clutch has on its upper and lower faces friction washers 97 engageable with opposed faces on the bevel gears. The clutch also has an annular channel 98 receiving anti-friction rollers mounted on the two arms or furcations 99 of a clutch shifting yoke 100. These yoke arms are pivotally mounted at 101 on suitable pivots mounted on the clutch housing 102. This yoke is centered by two centering springs 103 on a mounting rod 104 set into the top of clutch housing 102. Its swinging end is connected by spring arms 106 to the yoke 107 of a magnetic plunger operated by two opposed solenoids SO1 and SO3. Energization of the upper solenoid SO1 elevates the yoke to clutch the upper bevel gear 92 to shaft 95 and energization of lower solenoid SO3 lowers the yoke to clutch the lower bevel gear 93 to shaft 95. Said shaft is therefore driven in one direction or the other from motor 80 depending upon which of the two solenoids is energized. With both solenoids de-energized, the shaft 95 is stationary, though motor 80 runs at all times. Shaft 95 drives a shaft 110 journalled in deck 36 through spur gears 111 and 112 (Figure 12), and a bevel gear 113 on the upper end of shaft 110 meshes with a bevel gear 114 on a horizontal shaft 115 (see also Figure 6). Shaft 115 is journalled in a bearing 116 mounted on deck 36 and a bearing 117 mounted in end plate 118 mounted at the end of deck wing 37. The outward extremity of shaft 115 has a spur gear 120 meshing with a spur gear 121 on a horizontal lead screw 122, one end of which is journalled in suitable bearings 123 in the aforementioned end plate 118, and the other end of which is journalled in a bearing 124 carried by an end plate 125 at the end of opposite deck wing 38. A nut member 126 on lead screw 122 has a downward extension 127 (Figures 5, 6 and 7) carrying at the bottom a guide roller 128 which is guided in a longitudinal guide groove 129 formed in deck 36. This nut carries a laterally projecting pin 130 which is received in a vertical slot 131 formed in an insert member 132 set into the adjacent side of weight W1. Lead screw 122 is rotated from motor driven shaft 95 through the described transmission including shaft 115 and the various described gears, and such rotation causes translation of nut 126 and therefore traveling weight W1. It will be seen that the weight W1 may thus be slowly and uniformly driven longitudinally along beam 60 from the position shown in full lines in Figures 6 and 13 to the opposite end of the beam. Reverse rotation of the lead screw returns the weight to the initial position shown in the figures. It will be seen that the weight W1 normally stands stationary, while energization of either solenoid SO1 or SO3 effects travel of the weight along the beam in one direction or the other, as the case may be.

The machine also includes a circular platen 140, located below and in axial alinement with the loading rod 64, and adapted for support of certain later described appliances by which the sample to be tested is supported from below. A screwjack mechanism is provided for slowly elevating and lowering this platen 140, being located between the lower projecting portions 29 of the C-frame, and protruding upwardly through an aperture 141 in cover plate 47. The platen 140 is tightly mounted on the top end of a vertical screw 142. Around and screwthreadedly engaged with this screw 142 is a nut member 143, the lower end of which is supported, through bearing 144, on the head flange 145 at the upper end of an externally screw-threaded sleeve or screw member 146, screw 142 projecting downwardly within this sleeve member 146, and being relatively movable longitudinally therewithin. Surrounding and screwthreadedly engaged with sleeve member 146 is a nut member 147, supported through bearing 148 on the internal upwardly facing annular shoulder 149 formed inside annular jack frame 150. This jack frame 150 has, above shoulder 149, a vertical annular bore 151 within which is receivable the flange 145 of member 146, and also the major portion of the nut member 143. Set into the upper end of frame 150 is a bearing ring 153 which slidably engages and guides the external cylindrical surface of nut member 143, as clearly illustrated in Figure 5. Mounted on the upper end portion of nut member 143 is a handwheel 155 which extends out nearly to the diameter of platen 140, and which has a depending skirt portion 156 surrounding the upper portion of frame member 150. This handwheel is employed for rotating the nut member 143 to secure manual vertical adjustment of screw 142 relative to sleeve 146. To hold screw 142 against rotation during such rotation of handwheel 155, sleeve 146 is provided with a key 160 which is received in a longitudinal keyway 161 cut in screw 142. Sleeve 146 is also secured against rotation by means of a keyway 162 and a key 163 carried by a supporting member 164 secured to the bottom end of jack frame 150 and to a bottom plate 165 which is secured to the lower end of frame 150. The sleeve 146 will be understood to have a working fit through this bottom plate 165.

Jack frame 150 is rigidly secured to the C-frame members 29 by means of laterally projecting lugs 170 (see Figure 1) which are set into notches 171 cut into C-frame members 29, the lugs 170 bearing downwardly against shoulders 172 at the bottoms of recesses 171, and long screws 173 being provided to secure the jack frame 150 tightly down to the C-frame members 29. By this construction, the downward forces exerted on the jack frame during operation of the machine are transferred adequately to the forwardly projecting arm portions 29 of the C-frame.

The aforementioned nut member 147 carries at its bottom end a worm wheel 176 driven by a worm gear 177 on a horizontal shaft 178 which is journalled by means of suitable bearings such as indicated at 179 and 180 in a bearing supporting sleeve 181 formed integrally with jack frames 150, as clearly shown in Figure 9. A deflection power means, presently to be described, is drivingly connected to this shaft 178 to elevate or lower the jack mechanism and platen 140 carried thereby.

Before proceeding to a description of this power mechanism, however, it will be noted that rotation of shaft 178 acts through worm 177 and worm wheel 176 to rotate nut member 143, and the latter, screwthreadedly engaging the sleeve member 146, elevates or lowers said sleeve member 146, which will be recalled to be guided for longitudinal movement but constrained against rotation by the key 163 and keyway 162. Vertical movement of sleeve member 146 causes corresponding vertical movement of nut member 143 carried thereby, and therefore of the screw 142 and platen 140. The screwthreads between sleeve member 146 and nut member 147 are relatively fine. Coarser threads are provided between screw 142 and nut member 143, and it will be seen that rotation of handwheel 155 accordingly effects relatively rapid vertical adjustment of the screw 142 and platen relative to the nut member 143 and the relatively slowly driven threaded sleeve 146. In operation, the platen is elevated (or lowered) by rotation of nut member 147 and consequent drive of screwthreaded sleeve 146. For rapid preliminary adjustment, handwheel 155 permits vertical adjustment of screw 142 and the platen relative to the nut member 143 and screwthreaded sleeve 146.

Referring now to the power means for the screw jack mechanism, a deflection motor 180 is mounted on motor deck 40 (see Figure 6), and drives variable speed drive transmission unit 181, of the same type as previously mentioned unit 81. This speed control unit, like unit 81, has speed control mechanism operated by a gear 182, driven through meshing helical gears 183 and 184 from a shaft 185 operated from the front of the machine through a later described reduction gear box by means of a hand crank 186. Drive unit 181 drives a shaft 190 carrying a bevel gear 191 which meshes with either of two bevel gears 192 and 193 mounted for rotation on a vertical shaft 195 which is journalled for rotation in upper and lower walls of clutch box 196. A solenoid operated clutch 197, of the same nature as the previously described clutch 96, is splined to shaft 195 between the two bevel gears and is engageable with either to drivingly connect with said shaft. This clutch 197 will be understood to carry friction washers on its upper and lower faces, adapted for driving engagement with either of the two bevel gears 192 and 193, as described in connection with clutch 96. Also, the clutch is operable by the arms of a shifting yoke 198, pivotally mounted at 199 to the clutch box, and having operative engagement with the annular channel 200 of the clutch through suitable anti-friction rollers, all in a manner similar to the structure of clutch 96. Clutch shifting yoke 198 is shown as normally centered between springs 203, and the yoke is operated from solenoids SO2 and SO4, all as shown in Figure 8. It will be understood that energization of solenoid SO2 will clutch the motor driven bevel 192 to shaft 195, while energization of solenoid SO4 will clutch bevel gear 193 to shaft 195, and that the shaft 195 will be driven in one direction or the other depending upon which of said solenoids is energized. In the de-energized condition of both solenoids, of course, the centering springs 203 position the shifting yoke 198 in neutral, so that shaft 195 is stationary, though the motor 180 continues to drive at all times.

The lower end of shaft 195 projects downwardly through motor deck 40 and has on its lower extremity a spur gear 210, in mesh with a spur gear 211 on the upper end of a vertically disposed lead screw shaft 212 journalled at the top in member 42 and at the bottom in member 54, as best shown in Figure 5. The lower end of shaft 212 carries bevel gear 213, meshing with bevel gear 214 on the rearward extremity of the aforementioned jack screw drive shaft 178, the latter being journalled in member 55, as shown.

Thus the screw jack is driven either upward or downward from deflection motor 180 depending upon the position of clutch 197.

Lead screw 212 (Figures 5 and 8) carries a nut member 220 having a laterally projecting arm 221 whose end is vertically bored for sliding movement along a guide rod 222 so that rotation of lead screw shaft 212 will effect vertical translation of nut member 220 and its projecting arm 221, but rotation of said nut and arm is prevented by the sliding engagement of arm 221 with guide rod 222. This arm 221 carries adjustable switch actuating screws 224 and 225 adapted for engagement with limit microswitches MS2 and MS4, respectively. Both switches are normally closed, and the switch MS2 is opened when the screw jack has elevated the platen to its maximum limit of upward travel, while the microswitch MS4 is opened when the screw jack has been lowered to its lowermost position as shown in Figure 5.

Normally open zero and maximum limit microswitches MS1 and MS3 are also provided for the traveling weight W1, as shown best in Figure 7. The downwardly projecting arm 127 carried by lead screw nut 126 carries an adjustable screw 230 for switch MS1, and a similar screw 231 for switch MS3. These switches are actuated to open the circuit for the loading motor upon the weight W1 reaching its zero and maximum limit positions along beam 60.

In addition, microswitches MS5 and MS6 are provided, and are actuated by tilting of beam 60, the former being actuated by downward tilting of the beam, and the latter by upward tilting of the beam. The counterweight W3 on the swinging end of beam 60 carries a mounting plate with a lateral projection 236 (Figures 2 and 3) in which are two adjustable actuating screws 237 and 238, the former adapted to actuate microswitch MS5, and the latter microswitch MS6. Switches MS5 and MS6 are carried by a bracket 239 secured to the underside of deck wing 38. These switches are thus actuated when the beam deflects through a small angle from horizontal, up or down, as the case may be.

A control box 250, with a front panel 251, is secured to the forward end of upper part of the C-frame. Inside this control box are two gear boxes 254 and 255, each containing two reduction gear trains, the details of which need not be set forth herein as they may be of a conventional nature, and it will suffice to state that each gear train drives a dial type indicator which is visible through a window in the control panel. The two aforementioned shafts 85 and 185 which regulate the variable speed units 81 and 181, respectively, are driven through such gear trains, one in each box, from the cranks 86 and 186, respectively, positioned forwardly of control panel 251. Thus rotation of cranks 86 and 186 operates through the respective gear boxes to turn the speed control shafts 85 and 185, and the speed setting at any given time (for example, in units of load per minute, and units of deflection per minute) is revealed by the indicator dials 256, and 257, respectively, visible through suitable windows in the control panel.

The other gear trains within the gear boxes 254 and 255 drive suitable dial indicators 260 and 261, exposed through suitable windows in control panel 251. These indicators are driven from the load and deflection motors 80 and 180, respectively, from drive points outside of variable speed drive units 81 and 181. Thus, as seen best in Figures 5 and 12, shaft 95, driven from load motor 80 through variable speed drive unit 81 and clutch 96, has near its lower end a helical gear 264 meshing with a similar gear 265, which in turn meshes with a gear 266 on a horizontal shaft 267 extending forwardly into control box 250 and thence to gear box 254, wherein it drives a reduction gear train operating the indicator shown in Figure 1 at 260. (The shaft 267 does not appear in Figure 6 for the reason that it is directly under the speed control shaft 85). Also, the shaft 195, driven from deflection motor 180 through variable speed drive unit 181 and clutch 197, has, just above motor deck 40, a gear 268 meshing with a gear 269 which in turn drives a gear 270 on a horizontal shaft 271 reaching forwardly, directly under speed control shaft 185, into control box 250, and gear box 255. Within said box, this shaft drives reduction gearing operating the deflection indicator indicated in Figure 1 at 261.

A test time counter 276 inside control box 250, and exposed through a suitable window in panel 251, is driven through shaft 277 from a synchronous clock motor C. Counter 276 may be reset to zero by means of reset shaft 278 and external reset knob 279 (Figure 6).

Control panel 251 also carries "Beam Up" and "Beam Down" signal lights 290 and 291, and increment test switch MS7, preferably of a push button type, and the operating handles for control switches SW1 and SW2, and selector switches SW3, SW4 and SW5.

The loading rod 64 and platen 140 may be designed in various ways to receive and support the appliances by which the machine exerts forces on the sample to be tested, and such appliances are also subject to embodiment in a variety of forms depending upon the test to be applied. For illustrative purposes, the loading rod is here shown as provided at its lower end with a yoke 300 formed with an arcuate lower face 301, and the latter has a conical depression or seat 302 (Figure 5). The platen is formed with a flat top surface, and its rim is equipped with positioning pins 304 screwthreaded therethrough and provided with knurled heads 305 by which they can be manually manipulated.

Let it be assumed that a shear test is to be performed on a cylindrical core 306 of soil which has been cut from the earth, and that this core is contained within three contiguous rings 307, 308 and 309 (Figure 15a). See Patent No. 2,296,446, issued September 22, 1942 to Dames and Moore, for Method of Determining Driven Friction Pile Capacities. The two outside rings 307 and 309 are supported by spaced yokes 310 projecting upwardly from a base 314 mounted on the platen and centered thereon by means of the positioning pins 304 which may engage corresponding sockets in the bottom of base 314. A deep slot extends downwardly in base 314 between the two yokes 310, wide enough to freely receive the middle soil ring 308. The middle soil ring is engaged from above by arcuate face 301 of loading rod 64. Base 314 may also support devices 320 for applying end pressure to the soil core during test, but this subject matter forms no part of the present invention, and a description is hence unnecessary.

Load exerted downwardly on center ring 308 through loading rod 64 causes the soil core 306 to be sheared at two shear planes defined by the end faces of the center ring.

Figure 16 shows an appliance for carrying out a compression test on a cylindrical material sample 325, here shown as laterally unsupported, but which in many instances will additionally be provided with some suitable lateral support means. Here a base 326 is positioned on the platen, and the sample stands on end on a disk 327 on the top of said base. On the top of the samble is another disk 328, and a compression rod 329 connected to said disk 328 has its upper end seated in conical seat 302 in the lower end of loading rod 64. Rod 329 is passed through a guide plate 330 supported from base 326 by suitable legs 331. It will be evident that sample 325 may be compression loaded to failure by downward force exerted on loading rod 64.

Figure 17 shows a schematic electrical circuit for the machine as now described. Main power leads are indicated at 335 and 336, and are controlled by main power switch SW. Load and deflection motors 80 and 180 are connected across leads 335 and 336, as indicated.

Power lead 336 is connected to switch arms 337 and 338 of a double throw Return-Test control switch SW1, and with said switch in Test position, switch arm 337 connects the power lead to a lead 339 going to the arm 340 of a double throw Continuous-Increment selector switch SW4. With said switch SW4 in Continuous position, the circuit is continued via conductor 341 to switch arm 342 of double throw Load-Deflection selector switch SW3. With the latter switch in Load position, the circuit is continued via conductor 343 to switch arm 344 of double throw Increase-Decrease selector switch SW5. With said switch in Increase position, the circuit is continued to lead 345, which goes to maximum load limit microswitch MS3, the other side of which is connected to clutch actuating solenoid SO1, which is in turn connected by lead 346 to the other power lead 335. Thus solenoid SO1 is energized, and operates clutch 96 to cause load motor 80 to drive traveling weight W1 from its beginning or zero position longitudinally along the beam, gradually imposing load on the sample under test.

Lead 336 is also connected by switch arm 338, in the described position of SW1, to a lead 347 going to one side of electric clock motor C, the other side of which is connected by lead 348 to switch arm 349 of control switch SW2, said arm being connected, when switch SW2 is in Test position, to power lead 335.

The aforementioned Beam Up and Beam Down lights 290 and 291 are connected at one side by conductor 352 to power lead 335, and the other sides of said lights are connected through resistors $r1$ and $r2$ to normally closed contacts 353 and 354, respectively, of the aforementioned beam controlled microswitches MS5 and MS6. Said microswitches have movable arms connected by lead 355 to the other power lead 351, so that the lights 290 and 291 are normally in closed circuit and are illuminated. The movable arms of microswitches MS5 and MS6 are adapted to separate from contacts 353 and 354 and to make with normally open contacts 356 and 357, respectively.

Normally, with the beam 60 horizontal, microswitches MS5 and MS6 are in the positions illustrated in Figure 17. When the beam deflects downwardly through a small angle from horizontal, the movable arm of MS5 is separated from contact 353 and closes with contact 356; and when the beam deflects upwardly through a small angle above horizontal, the movable arm of MS6 is separated from contact 354 and closes with contact 357. Thus, actuation of MS5 when the beam tilts downwardly extinguishes Beam Up light 290, leaving Beam Down light 291 to indicate that the beam has tilted downwardly. Correspondingly, actuation of MS6 when the beam tilts upwardly extinguishes Beam Down light 291, leaving Beam Up light 290 illuminated to indicate that the beam is deflected upwardly.

The contacts 356 and 357 of microswitches MS5 and MS6 are connected by leads 358 and 359 to arms 360 and 361, respectively, of a double throw control switch SW1. Assuming switch SW1 to be thrown to the right, to Test position, the circuits from leads 358 and 359 are continued through leads 364 and 365, respectively, to the arms 366 and 367, respectively, of a double throw control switch SW2. Assuming switch SW2 to be thrown to the right, or to Test position, the circuits being traced are continued by leads 368 and 369, respectively, to the switch arms 370 and 371 of selector switch SW3.

Assuming switch SW3 to be thrown to Load position, the circuits continue through leads 372 and 373, respectively, to leads 374 and 375, respectively, going to clutch control solenoids SO2 and SO4 associated with deflection motor 180, connection being made from said solenoids to the other side of the power line by conductor 376. Deflection limit switches MS2 and MS4 are placed in leads 374 and 375, as indicated.

Assuming switch SW3 to be thrown to Deflection position, the circuits continue, alternatively, through leads 380 and 381, respectively, to leads 382 and 345, respectively, going to clutch control solenoids SO3 and SO1 associated with load motor 80, the circuit being completed from said solenoids to the other side of the power line by conductor 346. Leads 382 and 345 contain the aforementioned limit switches MS1 and MS3, respectively.

The system of the invention will be further described in connection with four different types of test of which the machine is capable.

*Continuous loading direct shear test*

In this test, the independent variable is the load imposed by the beam, and this load is to be gradually and continuously increased to failure of the sample (in this case complete shear). Selector switches SW3, SW4 and SW5 are thrown to Load, Continuous and Increase, respectively.

Assume that a sample of material, for example, a soil core, is to be tested in shear, using the appliances illustrated in Figures 14, 15 and 15a, and heretofore described. Assume further that loading weight W1 is in its zero position, with weight W2 hung from the left hand end of the beam, all as shown in Figure 13.

Assume further that the jack has been elevated by operation of its hand wheel until the middle test ring 308 around the core 306 is nearly in engagement with the yoke 300 on the bottom of loading rod 64. The platen is then further screwed up slowly by hand until the loading rod 64 is elevated slightly, swinging beam 60 upward sufficiently to actuate microswitch MS6 and thus extinguish Beam Down light 291. The platen is then lowered slightly until Beam Down light 291 just goes on. The deflection indicator 261 and time counter 276 are reset to zero. The desired loading and deflection speeds are set by means of hand cranks 86 and 186.

The test is started by throwing control switches SW1 and SW2 to Test. This closes the circuit, as traced immediately above, starting clock motor C driving test time counter 276, and energizing solenoid SO1 to start the drive of the traveling weight W1 by motor 80. The traveling weight is thus driven outward along the beam at constant speed, gradually increasing the loading exerted on the sample by the loading rod, as indicated by the Load-Time curve 400 in the graph of Figure 18.

As soon as some initial portion of the loading has been imposed, the beam is overbalanced, and swings down against the shearing resistance of the sample, incrementally shearing the sample. The beam, thus tilting to a slight angle below its normal horizontal position, actuates microswitch MS5, closing the previously traced circuit controlled thereby to energize solenoid SO2 and thus start the power drive of the screwjack, and thereby operating the latter to elevate the platen supporting the two end rings surrounding the sample core. The sample is thus forced upwardly, exerting an upward force on the beam, which thereupon returns to its horizontal position. In so doing, microswitch MS5 de-energizes solenoid SO2 and thereby stops the drive of the screw jack, so that the upward movement of the sample is arrested. By this time, the traveling weight has moved further out on the beam, causing the beam to descend again, under slightly greater load, and to cause a further incremental shear of the sample. This cycle as thus described is rapidly repeated a large number of times, until the sample is finally sheared. It will be seen that each incremental shear, as the sample yields with time under the imposed loading, causes the machine to react to elevate the sample, and return the beam to horizontal. The stepped curve 401 in Figure 18 illustrates, with very great exaggeration, the behavior of the machine in its reaction to the continuously increased load. Actually, if the true operation of the machine were to be depicted, the steps would be very minute, and there would be a very great number of the steps.

It will be seen that the stepped curve consists of horizontal segments 402 connected by segments 403 slanting slightly from vertical. The slanting segments represent the increments of upward travel of the platen, which occurs always at a constant "deflection speed," indicated in Figure 18 by dashed line DS. It must be understood that this "deflection speed" is not the speed at which the sample yields under the imposed load, but is the speed at which the platen elevates the sample following each actuation of microswitch MS5 to return the beam to horizontal. The horizontal segments of the curve represent the time intervals during which the beam falls against the sample under the imposed loading. Since the steps of the curve are actually very minute (there may be a thousand or so steps in the length of the stepped curve 401), the smooth curve 404 closely represents the actual behavior of the machine during the test, and such a smooth curve will be plotted to show the results of the test. This curve 404 represents also the actual yield of the sample under the imposed loading, it being evident that the actual yield of the sample is continuous and not "stepped."

In practice, curves 400 and 404 are plotted from simultaneous sets of readings taken from test time counter 276, and load and deflection indicators 260 and 261.

*Load by increment direct shear test*

In this case, the operation is as above, excepting that the load is applied by predetermined increments L1, L2, etc., rather than continuously. The switches are placed as in the first described test, with the exception that selector switch SW4 is thrown to Increment. To start the test, control switches SW1 and SW2 are thrown to Test, and increment switch MS7, which is preferably a push button type switch, is closed and held closed until the first predetermined load increment is obtained. In this connection, the loading speed is set by means of crank 86, the set loading speed is shown at indicator 256, and the time duration for the selected loading speed is noted. In general, the loading and deflection speeds are set high, since the ideal condition would actually be instantaneous application of load increments, and instantaneous deflection reaction. This however, is of course beyond the capabilities of an actual machine.

It will be seen from Figure 17 that, with switch SW4 thrown to Increment position, the circuit energizing solenoid SO1 which throws the clutch causing the traveling weight W1 to be driven by load motor 80 now has in it the push button switch MS7, so that weight W1 will be driven to give the selected load increment, and will be arrested (by release of increment switch MS7) when this load is obtained. As indicated by the graph of Figure 19, a load increment L1 is thereby exerted by the beam on the sample, and this load has been imposed during a short time interval T1, the loading being imposed at the rate indicated by dashed line LS. This load L1 is then left on during first time unit "1."

The machine then reacts to the load increment L1 in a manner generally similar to that described in the preceding test. Thus, the beam tilts downwardly with increasing load until microswitch MS5 is actuated. This clutches the screwjack to the deflection motor 180, and the screwjack raises the platen (at a deflection speed represented by DS), which in turn causes the sample to be moved upwardly against the beam, and the beam to be thereby re-elevated to horizontal. Under the loading imposed, the beam then tilts downward again, and the cycle is repeated. This continues as indicated by the stepped deflection curve 410. It will be seen that the slanting segments of the stepped curve represent again the increments of upward travel of the platen, the horizontal segments representing the time intervals during which the beam falls against the sample under the imposed loading. The stepped curve is again illustrated with great exaggeration, and the smooth curve 415 closely represents its actual behavior. The smooth curve 415 will be seen to represent the actual yield of the sample under the imposed loading, and it will be evident from the graph that the yield gradually decreases and finally approaches zero under the first imposed load increment L1.

Upon expiration of an arbitrary first time unit, with the load sustained under load increment L1 until the rate of increase of yield of the sample has approached zero, the increment switch MS7 is again depressed to cause imposition of a second load increment L2, this being accomplished during a time interval T2, after which the switch MS7 is released, and the test permitted to run through a second arbitrary time unit, all as clearly diagrammed in Figure 19. The cycle described for the first time unit is then repeated. This is continued for any desired number of time units, to ultimate failure of the sample.

*Continuous deflection direct shear test*

In this test, the independent variable is sample deflection imposed at a predetermined rate (imposed by driving the screw jack at a predetermined speed), and the dependent variable is the load developed by that deflection, the load developed being that necessary to shear the sample at the predetermined deflection rate. It will become apparent that this load is also the strength of the sample against the enforced shear.

Selector switches SW3, SW4 and SW5 are thrown to Deflection, Continuous and Increase, respectively. It is assumed that a sample of material is in the machine for a shear test, as described under "Continuous loading direct shear test."

The test is started by throwing control switches SW1 and SW2 to Test.

A circuit is thereby formed from power lead 336 through switch SW1 to lead 339, switch SW4, lead 341, switch SW3, lead 425, switch SW5, and lead 374 to deflection motor clutch solenoid SO2, and from there to the other power lead 335. The deflection motor 180 is thus clutched to the screw jack, and the screw jack gradually raises the platen, which in turn causes the sample to be moved upwardly against the beam, and the beam thereby to be raised to an angle above horizontal. At a slight angle above horizontal, the beam actuates microswitch MS6, closing the previously described circuit, including lead 359, switch SW1, lead 365, switch SW2, lead 369, switch SW3, lead 381, and lead 345 to solenoid SO1. The solenoid SO1 clutches load motor 80 to the mechanism for driving the traveling weight W1 outwardly on the beam. Accordingly, weight W1 moves outwardly on the beam a short distance, until sufficient loading is developed to cause the beam to tilt downwardly against the sample, incrementally shearing the same. As the beam tilts downwardly under this imposed loading, microswitch MS6 opens the circuit to SO1, and the loading motor is declutched, so that travel of weight W1 outwardly along the beam is arrested. Solenoid SO2 remains energized, however, and the platen therefore continues to rise, which again elevates the beam. This again actuates microswitch MS6 to clutch the loading motor, causing the weight W1 to move further outwardly on the beam, and the beam to again descend to horizontal, further incrementally shearing the sample. This performance of the machine continues until the yield point of the sample is reached.

Actual conditions which may be encountered in practice are shown in the graph of Figure 20. The graph of deflection vs. time is a straight line, as indicated at 430, it being understood that this line 430 represents the deflection speed of the platen. The load has been imposed by successive small increments, and the loading vs. time curve is accordingly of stepped form (with exaggeration) as indicated at 431. Loading speed is indicated by the slant line LS, and the "risers" of the stepped curve 431 accordingly have this same slope. The smooth curve 432 is the curve which should be obtained if the loading increments were made infinitesimally small, and represents the actual operation approached by the machine. The actual sample-deflection vs. time curve is indicated at 434, and has a stepped or wave form, shown also with exaggeration in Figure 20. This may be understood from the fact that the beam must be raised to increase the load, and the actual deflection must be at a greater rate than the rate of elevation of the platen in order to permit the beam to return to horizontal.

In the example given, the sample yields rapidly in the region 435 upon imposition of the last imposed load increment 436. This is the yield point of the sample. At this point the sample continues to yield under the last imposed load increment, at a rate in excess of the rise of the platen, so that instead of the beam being again deflected upwardly, it this time settles below horizontal. Finally, it drops to the point where lower microswitch MS5 is actuated, and this results in energization of solenoid SO3 through a circuit from MS5 including conductor 358, switch SW1, lead 364, switch SW2, lead 368, switch SW3 (in Deflection position), lead 380, and lead 382. This clutches load motor 80 to the driving means for the traveling weight W1, but with a reverse drive, so that weight W1 then moves in the reverse direction along beam 60, and reduces the loading on the sample.

Thereafter, to the end of the test, the loading is reduced by steps, while the sample yields according to a stepped or wave-like curve (Figure 20). Each time the sample yields slightly under these conditions, the beam falls below horizontal, which in turn reduces the load. This permits the beam to return momentarily to horizontal; but the sample continues to yield, the beam again falls, and so on to final complete failure of the sample.

Deflection by increment direct shear test

This test is similar to the preceding test, excepting that the deflection is imposed in successive increments. The switches are thrown as in the preceding test, excepting for SW4, which is thrown to Increment. The deflection and loading speeds are however generally set high, the ideal condition being an instantaneous incremental deflection, and an instantaneous load reaction. This cannot be achieved in practice, but the speeds are usually set to come as close as possible.

The test is started by throwing switches SW1 and SW2 to Test, and depressing increment switch MS7, which is held down for the duration of a predetermined deflection.

In this case, operation begins as in the preceding test, the platen being deflected during short time interval T1 to a value D1. As the platen begins to lift the sample, the beam is tilted upwardly above horizontal, closing MS6. This clutches the load motor to W1, starting the latter off outwardly along the beam. The actual deflection and loading speeds may be as indicated by lines DS and LS in Figure 21. If the machine could react instantaneously to the actual deflection of the platen, the load would be imposed according to the dotted curve 450. Its actual loading speed is limited, however, as indicated by LS. Now, as the platen begins to elevate the sample, the beam swings upwardly, closing MS6, and W1 starts outward along the beam, as already described. The sample then yields or deflects according to the actual deflection curve 451, while the load is increased along LS. The deflection with the increasing loading is at first slow, but then gains speed, as the curve shows. The sample deflection finally equals and then exceeds the platen deflection, and the beam accordingly passes through horizontal to a downward angle, whereupon switch MS5 is actuated, causing weight W1 to be moved in reverse along the beam, thereby decreasing the loading. This action is initiated at points 453 and 454 of the actual deflection and load curves, and the decrease in load then takes place as indicated at 455. The deflection of the sample then becomes nearly constant but has minor irregularities for the duration of the first time unit, while the loading is backed off in steps, as represented in Figure 21. Each time the beam tilts downwardly, the resulting actuation of MS5 incrementally reduces the loading; each time the beam then swings back toward horizontal, the sample tends to recover slightly, but again yields, and the beam drops to again actuate MS5. The loading is thus decreased along the stepped section 456 of the loading curve, while the actual sample deflection fluctuates slightly. The loading curve actually represents the strength of the soil under the enforced deflection increment.

At the expiration of time unit 1, increment switch is again held closed, bringing about a second incremental deflection D2 of the platen, and the performance is repeated. This is continued to final failure of the sample.

Miscellaneous operations

Following any of the above described tests, control switch SW1 is thrown to Return. This completes a circuit from power lead 336 through switch SW1 to a lead 460 connected to lead 382 going to clutch solenoid SO3 for load motor 80, and to a lead 461 connected to lead 375 going to clutch solenoid SO4 for deflection motor 180. Energization of solenoids SO3 and SO4 causes motors 80 and 180 to return the traveling weight and screwjack to their initial zero deflection positions.

The above tests have all been described with weight W2 hung from one end of the beam. Alternatively, weight W2 may be mounted atop the traveling weight W1, thus increasing the rate of loading, as mentioned earlier.

Switch SW2, when thrown to Manual, with switch SW1 open, permits manually controlled driving, in either direction, of either the traveling weight, or the screwjack. The circuit may be traced from power lead 336 through lead 462 to the switch arm 463 of switch SW2, thence via lead 464, lead 339, switch SW4 (assumed in Continuous position), and lead 341 to switch arm 342 of switch SW3. The circuit may then be continued through lead 343 or 425, depending upon the position of switch SW3, to the arms of switch SW5. If the latter switch is thrown to Increase, the circuit will be continued through lead 345 to energize clutch solenoid SO1 for load motor 80, or through lead 374 to clutch solenoid SO2 for deflection motor 180, as the case may be. Thus either the traveling weight W1, or the screwjack, will be driven in forward direction. If switch SW5 is thrown to Decrease, with switch SW3 in Load position, the circuit is continued from lead 343 to lead 467, then to lead 382, and thence to clutch control solenoid SO3 for load motor 80. If switch SW5 is thrown to Decrease, with switch SW3 thrown to Deflection, the circuit is continued from lead 425 through SW5 to lead 468 connected to lead 373, which connects to lead 375 going to clutch control solenoid SO4 for deflection motor 180. It will thus be seen that, with switch SW2 thrown to Manual, either the loading weight W1, or the screwjack, can be driven in either direction under manual control.

The previously described microswitches MS1 and MS3, actuated at the maximum limits of movement of traveling weight W1, automatically open the circuits to solenoids SO3 and SO1, thus stopping the drive of the traveling weight by its motor 80. In similar manner, microswitches MS2 and MS4 are opened automatically at the maximum limits of travel of the screwjack to de-energize the solenoids SO2 and SO4, thus arresting the operation of the screwjack.

Variations of the four principal tests described above are possible, as for example, a set of tests may be run with loading and deflection decreasing rather than increasing. Thus, by throwing SW5 to Decrease, a set of tests may be run in the reverse direction, the tests starting with the traveling weight in some beginning position along the beam, and being caused to travel in the direction to unload the sample. The deflection will in such cases start at some preset value, and data of interest may be obtained while unloading the sample and reducing its deflection. The machine as thus described, and as illustrated in some of its typical uses and tests, has many possibilities and uses and is capable of a variety of tests, only a few of which have been indicated. Sufficient has been disclosed to enable those skilled in the art to appreciate the nature and construction of the machine, its principle of operation, and its usefulness. The significance and interpretation of the selected illustrated tests herein described will be evident to those skilled in the art of soil mechanics and need not be further elaborated herein.

The above tests have all been described with "shear" chiefly in mind. Similar tests may be made with the machine set up for compression loading of the sample. Those skilled in the art will appreciate that, with some evident rearrangement, the machine can be readily adapted to the making of tension tests. The principal change is simply that the loading rod be connected to the beam on the opposite side of the fulcrum. Broadly speaking, the invention is not to be regarded as limited to any particular type of materials strength test.

It will be further understood that the drawings and description disclose merely one present illustrative embodiment of the machine, and that various changes in design, structure and arrangement may be made without departing from the spirit and scope of the invention as defined by the appended claims.

We claim:

1. In a testing machine, the combination of: a frame, a normally horizontal beam fulcrumed on said frame, a beam loading member mounted for longitudinal travel along said beam, power means for driving said beam loading member along said beam, a vertically disposed screwjack mounted on said frame, said screwjack including a power driven internally threaded vertically disposed sleeve, an externally threaded sleeve engaged therewith, means constraining the last mentioned sleeve to axial movement without rotation, a manually rotatable head mounted for rotation on the upper end of the last mentioned sleeve, said head having a vertical threaded bore extending therethrough and a vertically disposed screw extending through said bore in said head and through said sleeves and having screwthreaded engagement with said threads in said head, sample supporting means on the upper end of said screw, power means for operating said screwjack through said power driven sleeve, means linked to and moved by said beam for exerting a loading force on the sample supported by said support means on said screwjack, means for setting one of said power means in independent operation, and means responsive to and dependent upon the resulting action of the sample for setting the other of said power means in dependent operation.

2. In a testing machine, the combination of: a frame, a normally horizontal beam fulcrumed on said frame at a point approximately midway of its length, a loading weight arranged for longitudinal travel along said beam from one end to the other, a counterweight mounted on said other end of said beam, power means for driving said loading weight longitudinally along said beam from said one end to said other end, a vertically disposed screwjack on said frame, power means for operating said screwjack, sample support means carried by said screwjack, force thrust means linked to said beam at a point spaced beyond the fulcrum axis of said beam from its said one end, said force thrust means being adapted for exerting a loading force on the sample supported by said support means on said screwjack, means for setting one of said power means in independent operation, and means responsive to and dependent upon the resulting action of the sample for setting the other of said power means in dependent operation.

3. A materials testing machine for shearing a cylindrical sample contained within three adjoining, separable rings, comprising: a stationary frame, a beam fulcrumed on said frame, a beam loading member mounted for longitudinal travel along said beam, power means for driving said beam loading member along said beam, a screwjack mounted on said frame, power means for advancing the screw of said screwjack, means on said screw for supporting the two outer of the three rings on a common longitudinal axis which is at right angles to and fixed relatively to said screw, so as to be advanced by said screw in a direction at right angles to said common axis, devices mounted on said screw for applying opposed end pressures to the sample, means linking said beam to the middle ring for applying a shear loading force to the middle ring in a direction opposite to the direction of advance of said outer rings by said screw, means for setting one of said power means in independent operation, and means responsive to displacement of said beam from horizontal position for setting the other of said power means into dependent operation.

4. A materials testing machine for shearing a cylindrical sample contained within three adjoining, separable rings, comprising: a stationary frame, a beam fulcrumed on said frame, a beam loading member mounted for longitudinal travel along said beam, power means for driving said beam loading member along said beam, a screwjack mounted on said frame, power means for advancing the screw of said screwjack, means on said screw for supporting the two outer of the three rings on a common longitudinal axis which is at right angles to and fixed relatively to said screw, so as to be advanced by said screw in a direction at right angles to said common axis, devices mounted on said screw for applying opposed end pressures to the sample, means linking said beam to the middle ring for applying a shear loading force to the middle ring in a direction opposite to the direction of advance of said outer rings by said screw, means for setting the power means for said screwjack in independent operation, whereby to advance the two outer rings, and means for setting the power means for the beam loading member in controlled dependent operation to move the beam loading member in a direction to increase the loading on the middle ring upon upward deflection of the beam from horizontal and to decrease the loading upon downward deflection from horizontal.

5. A materials testing machine for shearing a cylindrical sample contained within three adjoining, separable rings, comprising: a stationary frame, a beam fulcrumed on said frame, a beam loading member mounted for longitudinal travel along said beam, power means for driving said beam loading member along said beam, a screwjack mounted on said frame, power means for advancing the screw of said screwjack, means on said screw for supporting the two outer of the three rings on a common longitudinal axis which is at right angles to and fixed relatively to said screw, so as to be advanced by said screw in a direction at right angles to said common axis, devices mounted on said screw for applying opposed end pressures to the sample, means linking said beam to the middle ring for applying a shear loading force to the middle ring in a direction opposite to the direction of advance of said outer rings by said screw, means for setting the power means for the beam loading member into operation to increase the loading on the middle ring, and means for setting the power means for the screwjack into dependent operation controlled by the beam to advance the screw and the middle ring in response to downward deflection of the beam below horizontal.

References Cited in the file of this patent

UNITED STATES PATENTS

| | | |
|---|---|---|
| 1,484,358 | Norton | Feb. 19, 1924 |
| 2,222,140 | De Iongh | Nov. 19, 1940 |
| 2,296,466 | Dames et al. | Sept. 22, 1942 |
| 2,316,432 | Hott | Apr. 13, 1943 |
| 2,321,717 | Wallace | June 15, 1943 |
| 2,329,826 | Clark | Sept. 21, 1943 |
| 2,348,782 | Bollee et al. | May 16, 1944 |
| 2,506,634 | Fields | May 9, 1950 |
| 2,554,206 | Pearson et al. | May 22, 1951 |
| 2,645,935 | Pramuk et al. | July 21, 1953 |

FOREIGN PATENTS

| | | |
|---|---|---|
| 624,621 | Great Britain | June 14, 1949 |